United States Patent [19]

Valentine

[11] Patent Number: 4,767,929

[45] Date of Patent: Aug. 30, 1988

[54] EXTENDED RANGE RADIATION DOSE-RATE MONITOR

[75] Inventor: Kenneth H. Valentine, Knoxville, Tenn.

[73] Assignee: The United States of America as represented by the United State Department of Energy, Washington, D.C.

[21] Appl. No.: 915,841

[22] Filed: Oct. 6, 1986

[51] Int. Cl.[4] .............................................. G01T 1/24
[52] U.S. Cl. ............................. 250/370.07; 250/388
[58] Field of Search ............. 250/370 F, 370 R, 388, 250/371, 374, 390 B; 307/359, 358, 519; 340/600

[56] References Cited

U.S. PATENT DOCUMENTS

| | | | |
|---|---|---|---|
| 3,702,936 | 11/1972 | Erickson | 250/388 |
| 3,959,653 | 5/1976 | Lee et al. | 250/374 |
| 3,984,690 | 10/1976 | Marshall, III et al. | 250/374 |
| 4,204,266 | 5/1980 | Nysen | 307/359 |
| 4,271,536 | 6/1981 | Copeland . | |
| 4,292,539 | 9/1981 | Todd | 250/388 |
| 4,588,892 | 5/1986 | Kopp | 250/374 |

FOREIGN PATENT DOCUMENTS

| | | | |
|---|---|---|---|
| 7158576 | 9/1982 | Japan | 250/374 |
| 6114590 | 6/1984 | Japan | 250/370 |

OTHER PUBLICATIONS

G. F. Knoll, "Radiation Detection and Measurement," John Wiley and Sons (1979), pp. 663–667.

Primary Examiner—Carolyn E. Fields
Assistant Examiner—John A. Miller
Attorney, Agent, or Firm—David E. Breeden; Stephen D. Hamel; Judson R. Hightower

[57] ABSTRACT

An extended range dose-rate monitor is provided which utilizes the pulse pileup phenomenon that occurs in conventional counting systems to alter the dynamic response of the system to extend the dose-rate counting range. The current pulses from a solid-state detector generated by radiation events are amplified and shaped prior to applying the pulses to the input of a comparator. The comparator generates one logic pulse for each input pulse which exceeds the comparator reference threshold. These pulses are integrated and applied to a meter calibrated to indicate the measured dose-rate in response to the integrator output. A portion of the output signal from the integrator is fed back to vary the comparator reference threshold in proportion to the output count rate to extend the sensitive dynamic detection range by delaying the asymptotic approach of the integrator output toward full scale as measured by the meter.

5 Claims, 2 Drawing Sheets

EXTENDED RANGE RADIATION DOSE-RATE MONITOR

BACKGROUND OF THE INVENTION

The present invention, which is a result of a contract with the United States Department of Energy, relates generally to radiation dose-rate monitors and more specifically to a wide-range dose-rate monitor which does not require range switching for dose-rate readout on a single scale into the extended range from background ($10^{-5}$ R/h) to at least 1000 Roentgens/ hour (R/h).

Most radiation monitors, like the personal pocket dosimeter, or "chirper", measure the total absorbed radiation dose detected by a detecting element. This measurement is obtained by integrating the charge from many detected radiation events on a capacitor either by discharging a previously charged capacitor, as with the pocket dosimeter, or charging a capacitor to a preset level, as with the "chirper." These instruments consume very little power but have a very low sensitivity. Further, when a person is suddenly exposed to a radiation field, a measurement of the radiation dose-rate is more useful than the total dose. This would allow the person to quickly sense the direction in which to move away from the maximum radiation field and thereby minimize the total absorbed dose.

The available portable monitors are also awkward to use because they require range switching for extended range monitoring or interpretation of meter readings in cases where logarithmic scales are used to obtain extended range readout.

Logarithmic counting circuits are used in wide-range counting channels such as in reactor control and safety systems. While these circuits may have a dynamic range of five to six decades, the indicated signal may actually decline as the input count rate continues to rise, thereby further limiting extended range counting of radiation events.

Thus, there is a need for a low-power, low-cost portable device for extended range counting (up to at least 1000 R/h) of x-ray or gamma ray radiation which does not require range switching for readout at different count rates and which does not suffer from the limitation of logarithmic readout devices.

SUMMARY OF THE INVENTION

In view of the above need, it is an object of this invention to provide a low power, inexpensive extended range radiation doserate monitor which does not require range switching for readout over the entire detection range of from 0 to at least 1000 R/h.

Further, it is an object of this invention to provide a radiation dose-rate monitor as in the above object which does not require logarithmic scale readout.

Other objects and many of the attendant advantages of the present invention will be apparent to those skilled in the art from the following detailed description of a preferred embodiment of the invention taken in conjunction with the drawings.

Briefly, the invention is an extended-range counter for measuring ionizing radiation dose-rates detected by a radiation detection element which produces current pulses at a rate corresponding to the rate of ionizing events produced in the detection element by the detected radiation and an amplitude corresponding to the charge deposited by each event. A pulse amplifying and shaping means responsive to the current pulses from the detection element, produces fixed width pulses at an output thereof having an amplitude proportional to the amplitude of the current pulses. These pulses are applied to the input of a threshold discriminator which generates an output count pulse for each input pulse which exceeds the discriminator threshold. These pulses are integrated by a pulse integrator to produce a voltage signal whose amplitude is proportional to the input pulse count rate. A portion of this voltage signal is fed back in a negative feedback arrangement to vary the discriminator threshold level in direct proportion to the output count rate to extend the sensitive dynamic detection range by delaying the asymptotic approach of the integrator output toward full scale as measured by a calibrated meter connected to the output of the integrator. The limiting factor on the extension of the dynamic detection range depends upon the particular operating system bias voltages. For practical portable systems with operating bias voltages of about ±3.6 volts, the detection range may be extended to at least 1000 R/h with a supply current of about 1 milliampere.

DETAILED DESCRIPTION OF A PREFERRED EMBODIMENT

Figure 1:
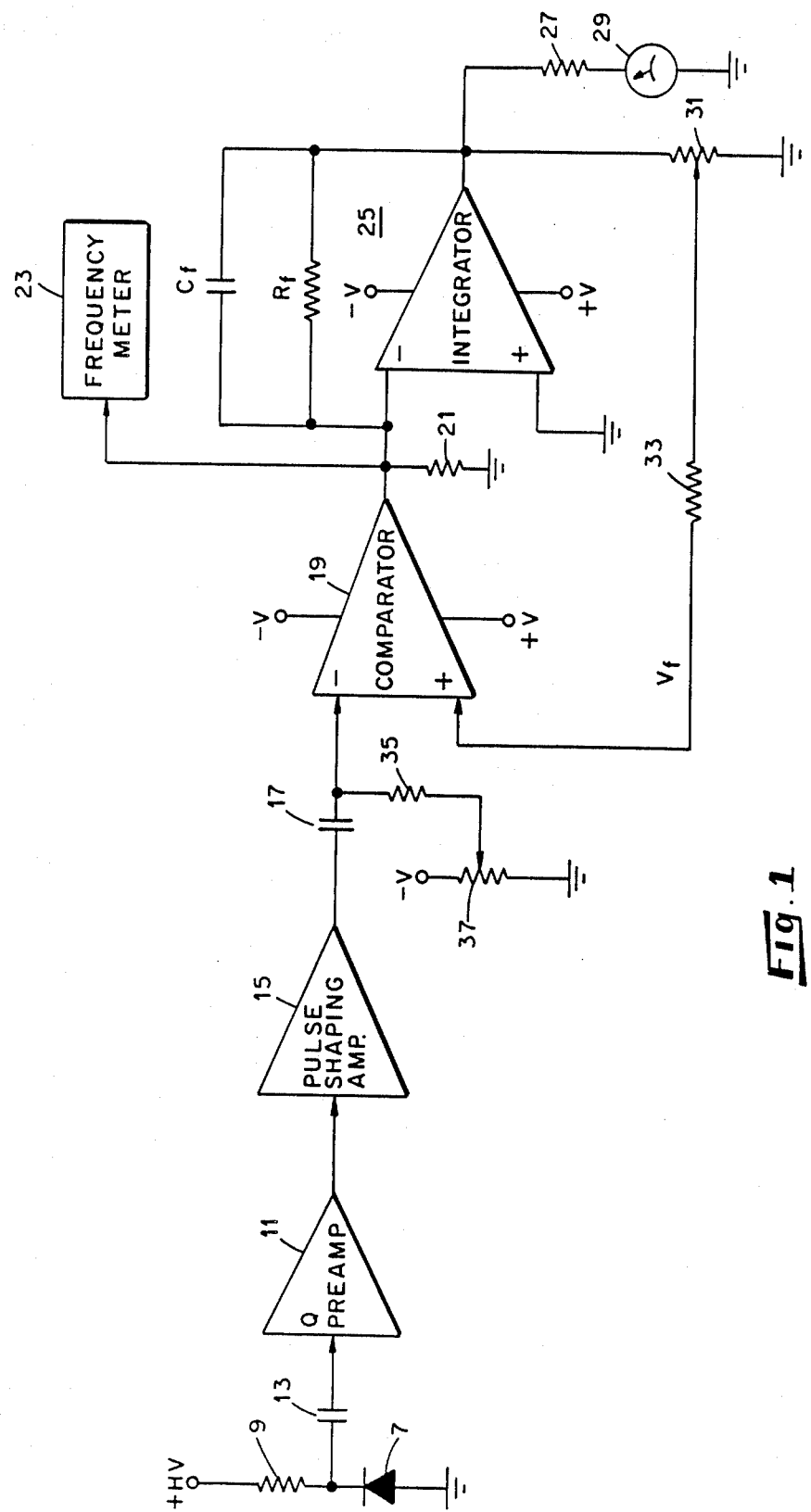
FIG. 1 is a schematic circuit diagram of an extended-range radiation dose-rate detection system according to the present invention.

Referring now to FIG. 1, there is shown an extended range radiation dose-rate monitor according to the present invention based on a solid state radiation detection element, such as a surface barrier diode detector 7, formed of intrinsic silicon. The diode used in the illustrated device is an ORTEC model #CB-20-100-1000 supplied by the ORTEC Co., Oak Ridge, Tenn. This detector is a charged particle surface barrier diode with a surface area of 1 cm² and a thickness of 1 mm. Other detecting elements, such as inexpensive PIN silicon diodes or proportional counters, may be used as the radiation detecting element. The diode 7 is connected in a reverse bias configuration by connecting the anode to ground and the cathode through a current limiting resistor 9 to the positive terminal of a high voltage supply (typically 270 V).

The current pulse signals generated upon the detection of ionizing radiation by the diode 7 are coupled to the input of a charge sensitive preamplifier 11 by means of a dc voltage blocking capacitor 13 connected between the cathode of diode 7 and the preamplifier 11 input. The output of the preamplifier 11 is connected to the input of a pulse-shaping amplifier 15 which generates voltage pulses in response to the detector current pulses from the preamplifier 11 having an amplitude proportional to the total charge deposited by the ionizing radiation detected by the detector and a time width, $\tau$, in the 2–20 microsecond range corresponding to the induced detector current pulses in the 20–200 nanosecond duration range, depending upon the detector 7 thickness and bias voltage.

The output of the pulse-shaping amplifier 15 is connected through a coupling capacitor 17 to the negative input of a comparator (discriminator) 19. The positive input of comparator 19 is connected to receive a feedback voltage $V_f$ which varies the threshold of the comparator as will be explained hereinbelow. Each pulse from the amplifier 15 whose amplitude exceeds the comparator threshold level ($V_f$) produces a comparator output pulse. Thus, by connecting the output of comparator 19, which is connected to ground through a load resistor 21, to a frequency meter 23, the radiation count rate may be read directly in digital form on the calibrated meter 23.

The output of the comparator is further connected to the input of an integrator 25 whose output is connected through a resistor 27 to an ammeter 29. The ammeter 29 is calibrated with an expanded scale for direct readout of the radiation dose-rate over the range of from 0 to at least 1000 R/h.

This wide range is obtained by feeding back a portion of the integrator output signal to vary the comparator 19 threshold voltage $V_f$ such that the threshold voltage increases as the dose-rate increases, thereby delaying the approach of the integrator output signal to the meter full scale value and extending the dynamic range of the device. The feedback is obtained by connecting the output of integrator 25 to ground through a potentiometer 31. The adjustable arm of the potentiometer 31 is connected through a resistor 33 to the positive input of the comparator 19 to form a negative feedback arrangement with respect to the comparator output. Thus, at low nuclear interaction rates the comparator is operated at a fixed low discrimination level set by the adjustment of the potentiometer 31 and at higher interaction rates the threshold level of the comparator 19 is increased and only triggers on the pulses which exceed the higher threshold level, as will be explained in more detail in the following description of the operation of system. Additional adjustment of the comparator threshold is provided by connecting the negative input of comparator 19 through a resistor 35 to the adjustable arm of a second potentiometer 37 connected between the system power supply line and ground potential. The potentiometer 37 is adjusted to provide a zero output on the meter 29 when the detector is subjected to only the normal background radiation level and to prevent detection of noise pulses generated by the detector and input circuitry from triggering the comparator 19.

In operation it is to be assumed that the circuitry, with exception of the detecting diode circuit, operates from dual supplies of +V and −V which are of equal magnitude. Through proper choice of integrated circuits, all of the circuitry shown in FIG. 1 can be operated with 1 milliampere of supply current and supply voltages of ±3.6 volts. The circuit has a band width of about 50 to 150 kHz.

During operation, X- and/or gamma rays interact with the intrinsic region of the diode detector 7 and create charge carriers which produce a current pulse of 20–200 nanosecond duration. The charge-sensitive preamplifier 11 responds to the resulting detector current pulse by generating a 50 to 100 microsecond tail-pulse having an amplitude proportional to the total charge deposited by the ionizing radiation. This pulse is then amplified and shaped by the pulse-shaping amplifier 15 and applied to the inverting (negative) input of comparator 19. If the adjustable arm of the feedback adjustment potentiometer 31 is set at ground, the circuit operates as a conventional charge-sensitive pulse counting system. That is, at sufficiently low count rates, less than about 0.1 R/h, the comparator generates one logic pulse each time a photon deposits more than the threshold energy level in the detector. These pulses are normally counted by the frequency meter 23 to display the dose-rate. At these dose rates, the system produces a count rate which is approximately proportional to the radiation dose rate. Beyond 0.1 R/h, the count rate begins to saturate at a frequency $f_o$ determined principally by the pulse shaping amplifier 15, as follows:

$$f_o = \frac{1}{2\pi} \left[ \frac{\int_0^\infty \omega^2 |T(\omega)|^2 d\omega}{\int_0^\infty |T(\omega)|^2 d\omega} \right]^{\frac{1}{2}}$$

where $\omega = 2\pi f$ and $T(\omega)$ is the amplifier 15 transfer function.

For most counting applications, this low threshold level system is considered useless at dose rates above 0.1 R/h because most users want a count rate output that is linearly proportional to the nuclear event rate. The conventional system approaches $f_o$ rapidly such that at a fixed threshold level of about 140 milovolts the system has little sensitivity beyond 1 R/h. It has been discovered that the system is still responsive at higher count rates if the threshold level of the comparator 19 is increased. However, fixing the threshold level at an increased value causes the system to be nonresponsive at low count rates.

Thus, in accordance with this invention a means has been provided to automatically extend the counting range of a dose rate meter by varying the threshold level of the discriminator by means of a feedback system arrangement which feeds back a portion of the integrated pulse rate signal provided at the output of the integrator 25. The integrator 25 integrates the comparator 19 output pulses to produce a current signal proportional to the dose rate. This signal is fed to meter 29 which is calibrated to read the dose rate in R/h over the extended dynamic detecting range of the system. The integrator time constant $\tau_f$ is selected to be long in comparison to the pulse rate at frequencies well below $f_o$ (i.e., $\tau_f = R_f C_f > > 1/f_o$) so that its response to an isolated pulse from the comparator 19 produces an insignificant change in the integrator output. But as the comparator trigger rate increases toward $f_o$, the integrator 25 output increases toward $+V/2$. By feeding back a portion of the integrator output signal through proper adjustment of the feedback potentiometer 31, the threshold voltage $V_f$ applied to the positive, or reference, input to the comparator 19 is varied in direct proportion to the integrator output to raise the threshold as the integrator output increases and vice versa. The potentiometer 31 is typically set during calibration so that the meter indicates 100 percent full scale for the maximum dose rate which the system is designed to detect. Calibration is performed in a conventional manner by exposing the detector element to radiation from a calibrated source, such as the Civil Defense Model V-794 radiation detector calibrator.

Figure 2:
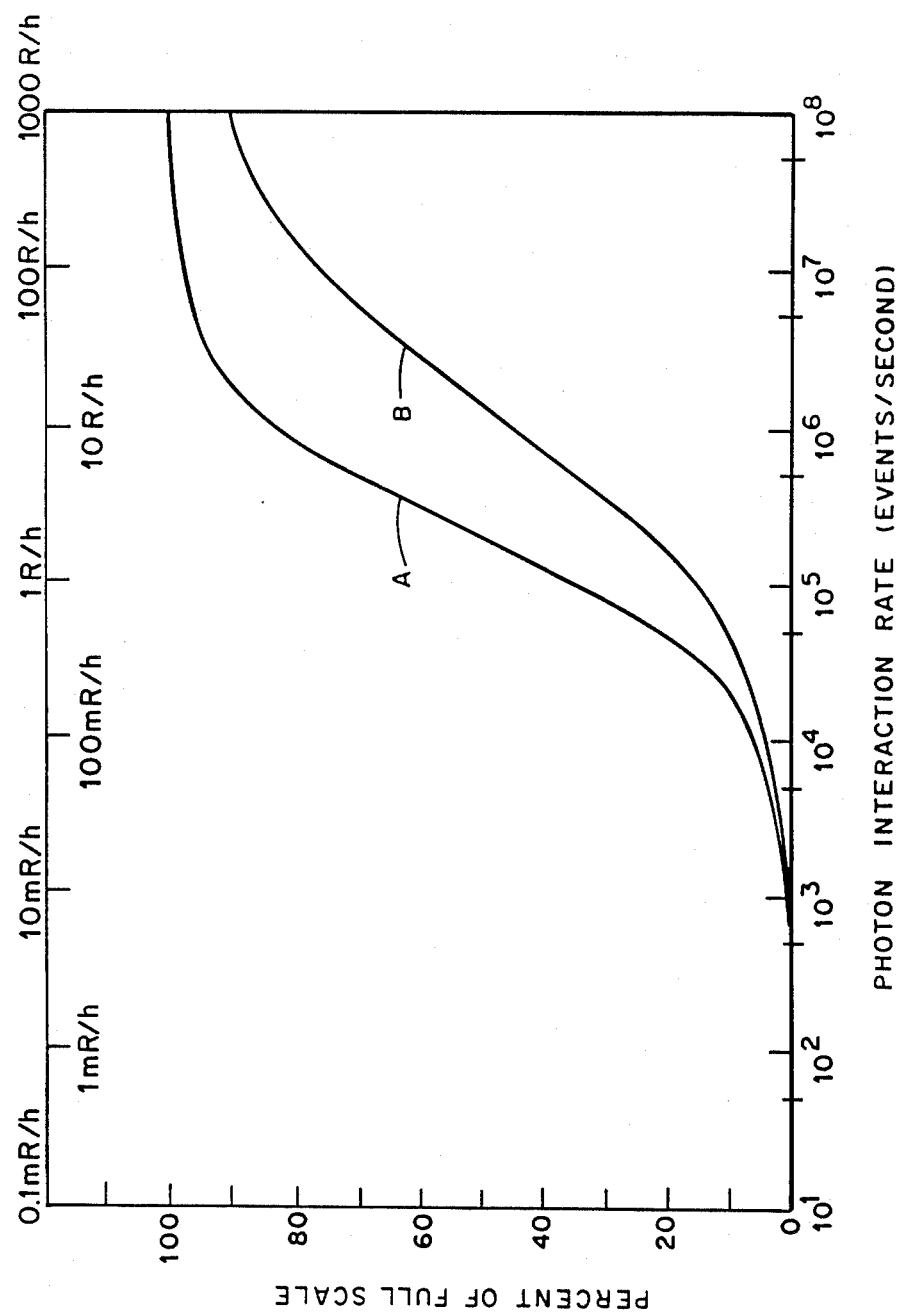
FIG. 2 is a semilog plot of measured dose-rate (R/h) versus percent of full scale deflection comparing the response range for a conventional counter (Curve A) and the extending range counter as in FIG. 1 (Curve B). A 100 mm³ Si solid state detecting element was used for this illustration.

Referring now to FIG. 2, there is shown a comparison between the output signal from the integrator 25, in percent of full scale of the meter 29 for a fixed comparator threshold system (Curve A) and the variable threshold system of the present invention (Curve B) for dose rates ranging from 0.1 m R/h to 1000 R/h corresponding to photon interaction rates of 101 to 108 events/seconds. As shown, the variable threshold system extends the detection range automatically by feeding back a portion of the integrator 25 to vary the comparator 19 threshold reference voltage. The dynamic counting range is extended by at least one decade by delaying the asymptotic approach to 100 percent full scale of the meter deflection.

As will be noted in FIG. 3, the conventional linear counting range extends from 0 to about 104 events/second, corresponding to 0 to 0.1 R/h. This linear portion may be preserved by clamping the adjustable arm of potentiometer 33 to ground by means of a conventional diode clamp circuit (not shown), until the integrator output exceeds the level corresponding to a dose-rate of 0.1 R/h. With this circuit addition, the lower end of the calibrated scale of the meter 29 would be linear with respect to the dose-rate for values below 0.1 R/h.

Thus, it will be seen that an instrument has been provided which allows extended range detection of radiation dose-rates of ionizing radiation, such as x-rays or gamma rays, without the need for range switching. Since the measurement is based on dynamic detector response, it is insensitive to temperature-sensitive leakage currents which are typically much larger than the signal current.

Although the invention has been illustrated by means of a specific embodiment, it will be apparent to those skilled in the art that various modifications and changes may be made therein without departing from the spirit and scope of the following claims attached hereto and forming a part of this specification.

I claim:

1. An extended range counter system for measuring ionizing radiation dose-rates up to at least 1000 R/h, comprising:
    an ionizing radiation detector means for producing current pulses at a rate corresponding to the photon interaction rate of ionizing radiation to be detected and having an amplitude proportional to the charge deposited by each photon of radiation detected;
    an amplifier means responsive to each of said current pulses for generating fixed width voltage pulses at an output thereof having an amplitude proportional to the amplitude of said current pulses;
    a comparator means having a signal input connected to the output of said amplifier means and a reference voltage input for generating a logic pulses at an output thereof for each input pulse from said amplifier means which exceeds the comparator means threshold determined by a reference voltage level applied to said reference voltage input of said comparator means;
    an integrator means connected to the output of said comparator means for integrating said logic pulses to provide an output signal proportional to the rate of logic pulses applied to the input thereof;
    a signal feedback means for feeding back a selected portion of the output signal from said integrator means to said reference voltage input of said comparator means to vary the comparator means threshold so that as the radiation dose-rate detected by said detector means increases the comparator means threshold increases to extend the sensitive dynamic range of the system up to at least 1000 R/h; and
    a meter connected to the output of said integrator means and calibrated to indicate measured radiation dose-rate in response to the output signal of said integrator means.

2. The system as set forth in claim 1 wherein said detector means is a solid-state radiation detecting element.

3. The system as set forth in claim 3 wherein said signal feedback means includes a potentiometer.

4. The system as set forth in claim 3 wherein said amplifier means includes a charge sensitive preamplifier connected to the output of said detector means and a pulse shaping amplifier connected to the output of said charge sensitive preamplifier and having an output connected to the signal input of said comparator means.

5. The system as set forth in claim 4 further including a frequency meter connected to the output of said comparator means and calibrated to indicate the measured radiation dose rate in response to the rate of pulses generated at the output of said comparator means.

* * * * *